United States Patent [19]
Johnson

[11] Patent Number: 5,912,959
[45] Date of Patent: Jun. 15, 1999

[54] METHOD OF AND SYSTEM FOR PASSWORD PROTECTION IN A TELECOMMUNICATIONS NETWORK

[75] Inventor: William J. Johnson, Flower Mound, Tex.

[73] Assignee: MCI Communications Corporation, Washington, D.C.

[21] Appl. No.: 08/775,005

[22] Filed: Dec. 27, 1996

[51] Int. Cl.[6] .................................................. H04M 3/42
[52] U.S. Cl. .......................... 379/188; 379/196; 379/207
[58] Field of Search ............................. 379/67, 196, 197, 379/198, 188, 189, 201, 199, 207, 67.1

[56] References Cited

U.S. PATENT DOCUMENTS

| | | | |
|---|---|---|---|
| 4,266,098 | 5/1981 | Novak | 379/199 |
| 4,277,649 | 7/1981 | Sheinbein | 379/201 |
| 4,782,508 | 11/1988 | Borchering et al. | 379/197 |
| 4,937,854 | 6/1990 | Sarakas | 379/199 |
| 5,157,712 | 10/1992 | Wallen, Jr. | 379/199 |

*Primary Examiner*—Ahmad F. Matar

[57] ABSTRACT

A method of and system for completing a telephone call from an originating number to a password protected destination number at a terminating switch. The system receives dialed digits from the originating number, and compares the dialed digits received to candidate dialing schemes. Whenever a sequence of dialed digits received satisfies a dialing scheme for a call to a destination number, the system waits to receive trailing dialed password digits. When the system has received the trailing digits, the system sets a destination number equal to the sequence of dialed digits received, and sets a password equal to the trailing digits received. The system then forwards a call request with the set destination number and the set password to the terminating switch for call processing. The terminating switch determines whether the destination number has a password associated with it, and if so, completes the call only when the set password matches the password associated with the destination number.

19 Claims, 5 Drawing Sheets

METHOD OF AND SYSTEM FOR PASSWORD PROTECTION IN A TELECOMMUNICATIONS NETWORK

FIELD OF THE INVENTION

The present invention relates generally to telecommunications system privacy protection and more particularly to a method of and system for password protecting numbers in telecommunications systems in which a password must be appended to a destination number before a call is completed to a password protected destination number.

DESCRIPTION OF THE PRIOR ART

The public has gained many benefits from the telephone. The telephone has enabled people to communicate relatively cheaply and efficiently with family and friends, as well as carry out business, virtually throughout the world. Nearly everyone is happy to be able to have the ability to make calls to and receive calls from people and businesses with which they want to communicate.

Unfortunately, particularly in the home environment, the telephone allows people to be contacted by parties they do not wish to hear from. Except in certain limited cases, anyone that has a person's telephone number can complete a call to that person's residence. Accordingly, people can feel bombarded with unwanted telephone calls from solicitors, telemarketers, obscene callers, former acquaintances, and the like. Most people view these calls as a substantial invasion of their privacy.

Telephone companies have long provided unlisted service. For a charge, a telephone company will not list a phone number in its telephone directory and not provide the number through directory assistance. However, an unlisted number is not necessarily unavailable. When people apply for credit or make other transactions, they are often required to include in their application their telephone number. The other parties in such transactions often sell telephone lists, thereby making unlisted numbers available to telemarketing businesses. Also, a person may have given an unlisted number to an acquaintance that the person later wishes not to hear from. Over the course of time, owners of unlisted telephone numbers may feel the need to incur the trouble and expense of having their number changed.

Recently, telephone companies have introduced services that provide some measure of protection against the receipt of unwanted telephone calls. One such service is Call Blocking, which enables customers to block calls originating from designated telephone numbers. The Call Blocker customer can either enter a number to be blocked or block the last call received at the customer's number.

Call Blocker service is good in that blocked calls do not even ring at the customer's telephone. However, a shortcoming of Call Blocker service is that only a relatively few numbers can be blocked, and numbers must be known to be blocked. Since there is a seemingly infinite number of telemarketers and since single telemarketers often place calls from several different numbers, Call Blocker service is not entirely satisfactory for eliminating calls from telemarketers. Call Blocker can be effective for blocking calls originated from the telephone of a particular individual; however, that individual can always place a call from another telephone number, and thereby circumvent the Call Blocker service.

Another recently available privacy protection service is Caller ID. For a fee, and with the purchase of a Caller ID device, customers can screen telephone calls received at their number. With Caller ID, a customer can decide whether or not to pick up a particular call. A shortcoming of Caller ID is that the phone still rings, requiring the customer to go to and look at the Caller ID device before deciding whether or not to answer the call. Therefore, the customer may be bothered by unwanted calls. Moreover, Caller ID systems include a facility whereby the caller can make the call anonymous, thereby circumventing the customer's Caller ID service.

A useful adjunct to the Caller ID and Call Blocker services is Anonymous Call Rejection. With Anonymous Call Rejection, a customer can block calls from anyone that does not desire to be identified.

With all the services that are currently available, there is still no way to preserve a customer's privacy completely and conveniently. All of the currently available services for screening or blocking calls require some action on the customer's part and can be circumvented. Accordingly, it is an object of the present invention to provide a service that provides maximum protection and convenience for the privacy of a telephone customer.

SUMMARY OF THE INVENTION

Briefly stated, the present invention provides a method of and system for password protecting destination telephone numbers so that the owner of a destination number can limit calls to the destination number only to those made by callers who know a password set by the owner of the destination number. In one of its aspects, the present invention provides a method of associating a password with a destination telephone number, which includes receiving dialed digits from a caller located at a telephone number. Whenever the dialed digits received matches a set-password dialing sequence, the system prompts the caller to enter a password. The system associates a password entered by the caller with the account record for the telephone number from which the caller entered the password.

Preferably, the prompt includes instructions for the caller to enter a sequence of dialed digits up to a maximum number of digits followed by a delimiter. The prompt may also include instructions for the caller to enter a universal access password, so that the caller may select for the telephone number not to be password protected.

In another of its aspects, the present invention provides a method of and system for initiating a telephone call from an originating number to a destination number. The method includes receiving dialed digits from the originating number and comparing dialed digits received to candidate dialing schemes. Whenever a sequence of dialed digits received satisfies a dialing scheme for a call to a destination number, the system waits to receive trailing dialed password digits from the originating number. At the first to occur of the expiration of a preset period for the entry of trailing digits or the receipt of a predetermined maximum number of trailing password digits, the system sets a destination number equal to the sequence of dialed digits received from the originating number that satisfies a dialing scheme for a call to a destination number, and sets a password equal to any trailing password digits received from said originating number. The system then forms a call request with the set destination number and any set password that may have been dialed for call processing.

In another of its aspects, the present invention provides a method of and system for completing a telephone call to a destination number, which includes receiving at a terminating telephone switch a request for call completion to a destination number. The system determines whether the destination number has a password associated with it, and if so, whether the call request includes a password. The system completes the call to the destination number when a password included with the call request matches the password, if any, associated with the destination number. The system aborts the call request whenever a password included with the call request does not match the password associated with the destination number.

DESCRIPTION OF THE PREFERRED EMBODIMENT

Figure 1:
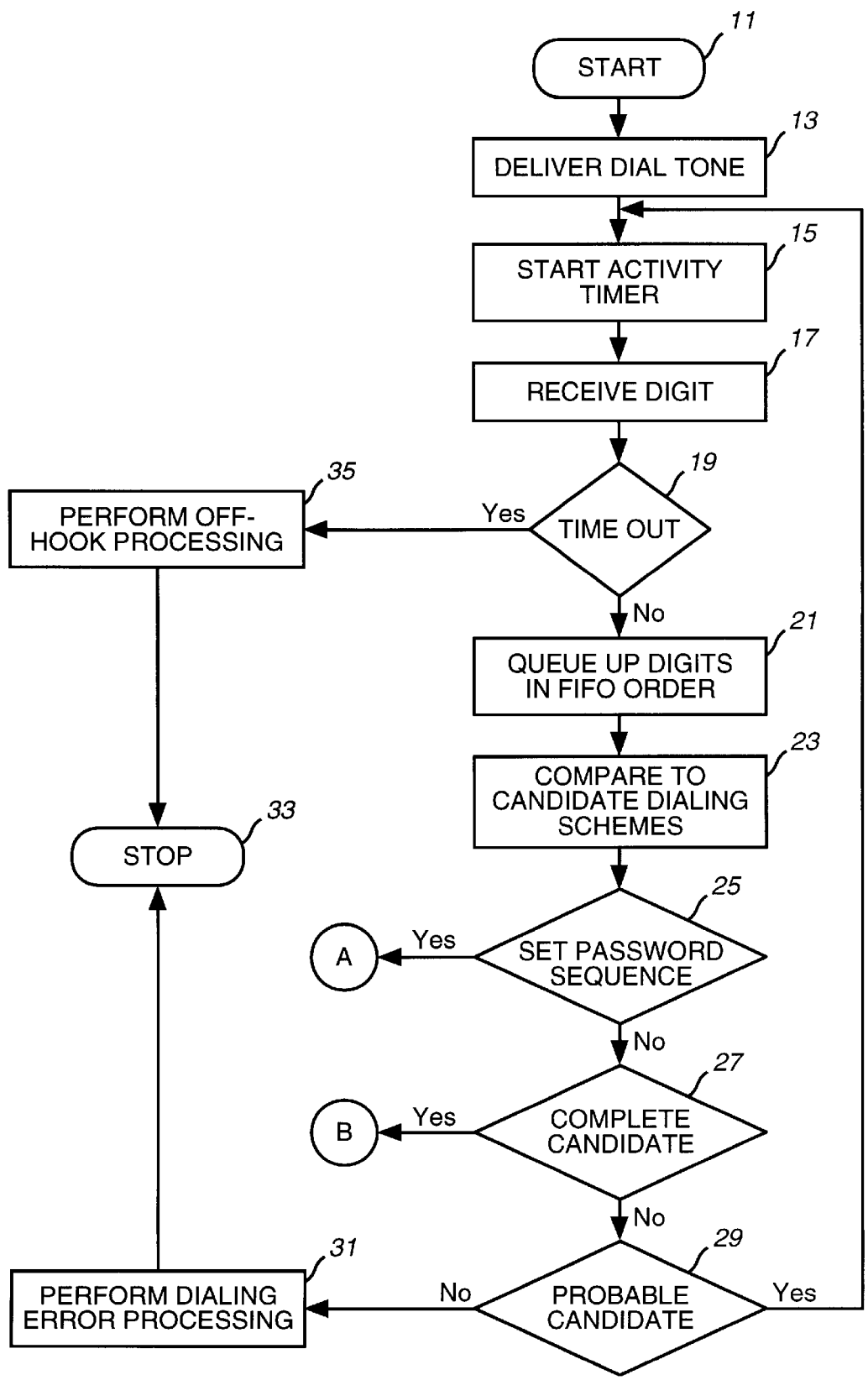
FIG. 1 is a high level flow chart of the processing of calls from an originating telephone switch according to the present invention.

Referring now to the drawings, and first to FIG. 1, processing of calls at an originating telephone switch starts at block 11. When a telephone connected to the originating telephone switch goes off-hook, the system delivers a dial tone to the telephone, at block 13, and starts an activity timer, at block 15. The system then waits to receive dialed digits, preferably in the form of DTMF tones. If the system does not receive a dialed digit, at block 17, within a time period as determined by the activity timer, then block 17 continues to decision block 19, where it is determined if a time out occurred. Then, block 35 performs error processing for lack of off-hook activity, i.e. dialing a phone number. Block 35 continues until the caller hangs up. Thereafter, processing terminates at block 35. If the system does receive a dialed digit, then block 17 continues to decision block 19, where it is determined that a digit was received, and the system puts the received digit into a first-in-first-out (FIFO) queue, at block 21. At block 23, the system compares the contents of the FIFO queue to candidate dialing schemes.

The system includes a table of valid candidate dialing schemes. For example, under the North American Numbering Plan, a telephone address is a 10 digit number that includes a three digit numbering plan area code, which is commonly called an area code, and a seven digit directory number that includes a three digit central office code and a four digit station number. Thus, telephone addresses under the North American Numbering Plan are of the form NPA-NXX-XXXX.

As is well known, a caller does not need to include the area code when dialing a number within the local dialing area. Accordingly, local calls are of the form NXX-XXXX. Calls outside the local dialing area are initiated by dialing a 1 followed by the number and international calls are initiated by dialing 011, followed by a country code and a number.

In addition to dialing sequences that initiate calls to customer numbers, there are service activation dialing sequences. For example, *77 activates Anonymous Call Rejection. There are also so called "slam" numbers, such as 10ATT, that take a caller immediately to a specific provider's switch.

In the process of comparing the queued up digits to the candidate dialing schemes, the system tests at decision block 25 whether or not the queue of digits dialed so far is equal to the set-password activation sequence. For example, the set-password activation sequence might be *75. Thus, if the queue is equal to *75, the system continues to the set-password sequence of FIG. 2.

If, at decision block 25, the queue is not equal to the set-password activation sequence, the system tests at decision block 27 whether or not the queue is equal to a complete candidate. In the context of this disclosure, a complete candidate is a sequence of digits that forms a valid telephone number according to the table of candidate dialing schemes. If the queue is equal to a complete candidate, then the system continues to the flow chart of FIG. 3 to complete call processing to the terminating telephone switch.

If, at decision block 27, the queue does not equal a complete candidate, then the system tests at decision block 29 whether or not the queue of digits dialed so far is equal to a probable candidate. If the queue of digits dialed so far satisfies no candidate dialing scheme, then the system performs dialing error processing at block 31 and stops at block 33. Block 31 continues until the caller hangs up. If, at decision block 29, the queue is equal to a probable candidate dialing scheme, the system returns to block 15 for restart of the activity timer.

The system thus loops through the process of FIG. 1 until either the queue satisfies the tests of decision blocks 25 or 27, fails the test of decision block 29, or the activity timer times out at decision block 17. A single dialed digit is processed for each loop iteration at block 21.

Figure 2:
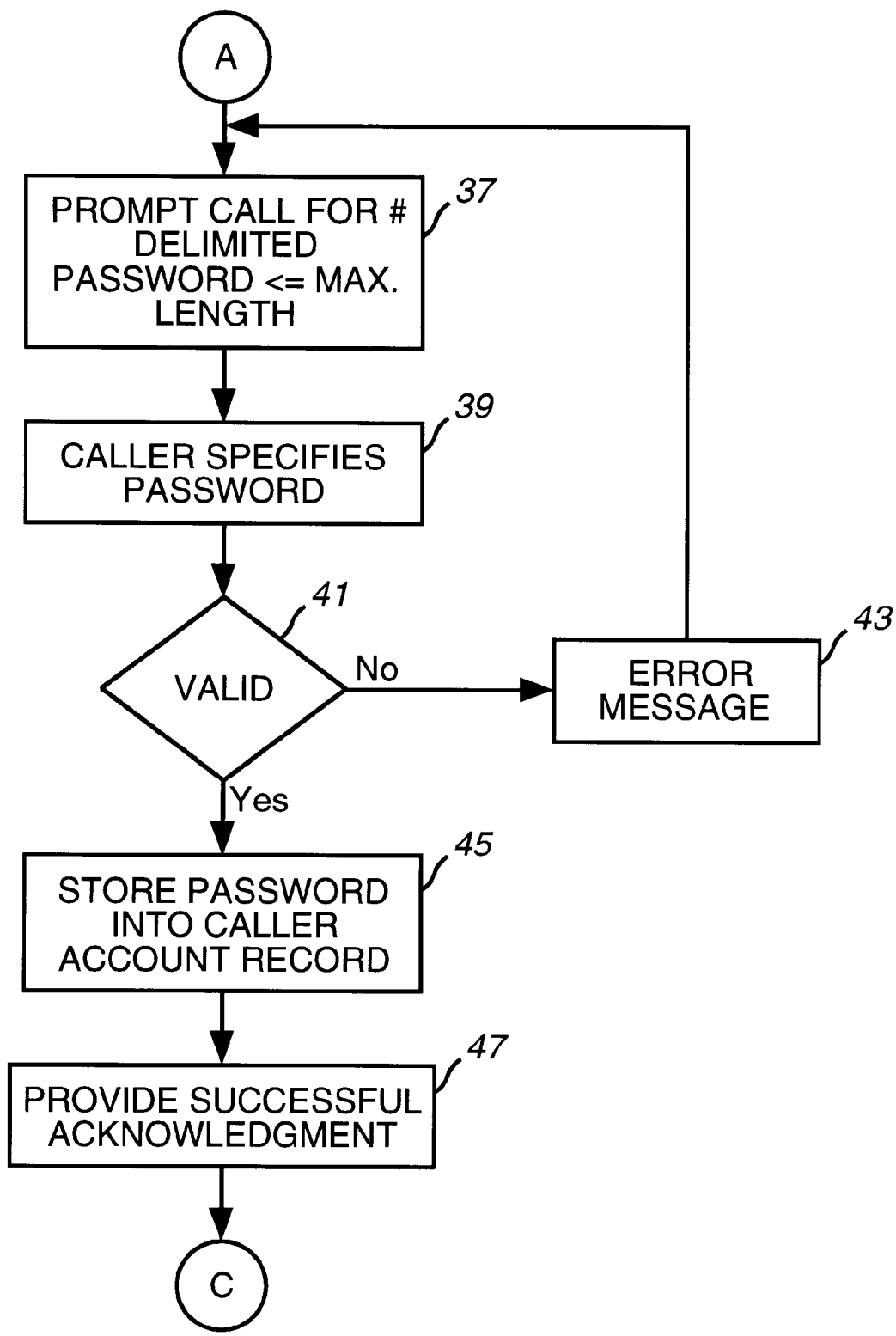
FIG. 2 is a high level flow chart of the set password routine of FIG. 1.

If, at decision block 25, the queued up digits are equal to the set-password sequence, then the system continues to the flow chart of FIG. 2. Referring now to FIG. 2, the system prompts the caller to enter a password at block 37. The prompt preferably includes instructions for the caller to enter a sequence of digits up to a maximum length followed by a delimiter, which in the preferred embodiment is the # key. Thus, the caller might be prompted to enter up to five digits followed by the # key. The prompt preferably also includes instructions for setting universal access to the telephone number. In the preferred embodiment, universal access is set by entering 0#.

After the prompt, the system then waits for the caller to specify a password by entering a string of digits followed by a delimiter, at block 39. After the caller has specified a password, the system tests, at decision block 41, whether or not the password entered is valid. For example, the password entered by the caller may exceed the maximum allowable password length. If the password is not valid, the system gives the caller an error message at block 43 and returns to block 37 to prompt the caller again to enter a password. If, at decision block 41, the password is valid, the system stores the password into the account record for the number from which the call is placed, at block 45. The system then delivers the caller a successful acknowledgement, either in the form of a tone, or a spoken acknowledgement, at block 47 and returns to block 13 of FIG. 1 to deliver the caller a dial tone. The caller may either hang up or enter other digits.

An alternative embodiment to FIG. 2, which minimizes switch resources, is to accept the password as delimited trailing digits to the set password sequence detected at decision block 25, rather than prompting the caller to enter a password. Then, block 43 could be an error tone and block 47 a success tone. This would be a consistent methodology with current telephone transactions, such as call forwarding.

In the preferred embodiment, the default password is universal access. Thus, when service according to the present invention is started for a customer, the password is set to universal access. As will be explained hereinafter, telephone systems, whether or not they are enabled according to the present invention, process calls to universal access numbers as if they were not password protected. Accordingly, a number is effectively not password protected until its owner expressly sets a password. Also, it should be recognized that an owner can change a password at any time, either to a new password, or to universal access, with FIG. 2 processing.

Figure 3:
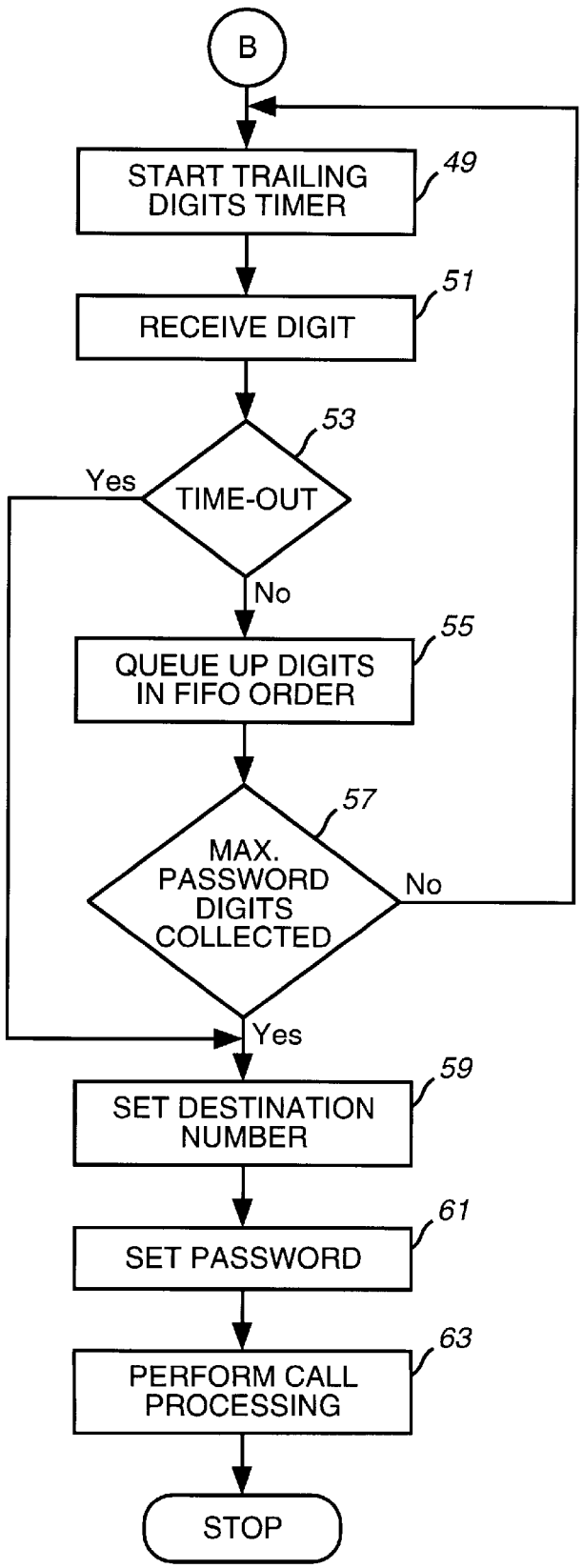
FIG. 3 is a high level flow chart of the append password and complete call request routine of FIG. 1.

Referring again to FIG. 1, if, at decision block 27, the queue is equal to a complete call candidate, the system continues to the process of FIG. 3. Referring to FIG. 3, the system starts a trailing digits timer at block 49, and waits at block 51 either for the trailing digit timer to time out or to receive a digit. Thereafter, decision block 53 determines if the duration of the activity timer elapsed without detecting a digit, in which case processing continues to block 59, which is described below.

If, at decision block 53, a digit was received, then the system queues up digits received in FIFO order at block 55. A single dialed digit is processed for each loop iteration of block 55. As digits are received and queued up, the system tests at decision block 57 whether or not the maximum number of password digits have been collected. If not, the system returns to block 49 to restart the trailing digits timer.

The system collects trailing digits until either the trailing digits timer times out at decision block 51 or the maximum password digits are collected at decision block 57, whereupon the system sets the destination number equal to the queue of digits collected at block 21 of FIG. 1, at block 59, and sets the password equal to the queue of digits collected at block 55, at block 61. Then, the system performs call processing, at block 63. Block 63 processes through FIG. 4 processing and terminates upon completing or aborting the call.

Call processing includes the processing of call establishment from the originating telephone switch to the terminating telephone switch. The originating telephone switch and terminating telephone switch may in fact be the same switch, for example, parties to a call connected to the same Local Exchange Company (LEC). The originating telephone switch may connect directly to the terminating telephone switch, for example, parties to a call in the same calling area. The originating telephone switch may connect to the terminating telephone switch through one or more intermediary switches, for example, for a long distance call.

In any case, call processing involves out-of-band call processing or in-band call processing. During out-of-band call processing, the password data is transported with call initiation and setup data on a separate connection than will be used for the call. During in-band call processing, the password data is transported with call initiation and setup data on the same connection that is used for the call.

There are many embodiments for transporting the password data as well known to those skilled in the art. For example, in an MCI out-of-band environment utilizing SS7 (Signaling System #7), the password data is transported with the IAM (initial address message) during call setup.

It will be observed at FIG. 3 that the preferred system of the present invention does not require the caller to place delimiters between the telephone number called and the password, or after the password. The caller simply dials the number and trails the password. Additionally, the system of the preferred embodiment of the invention does not prompt the user to enter a password at the completion of dialing the number. The trailing digit timer is preferably set to a relatively short time out period so as not to cause unreasonable or annoying delays in call processing.

Figure 4:
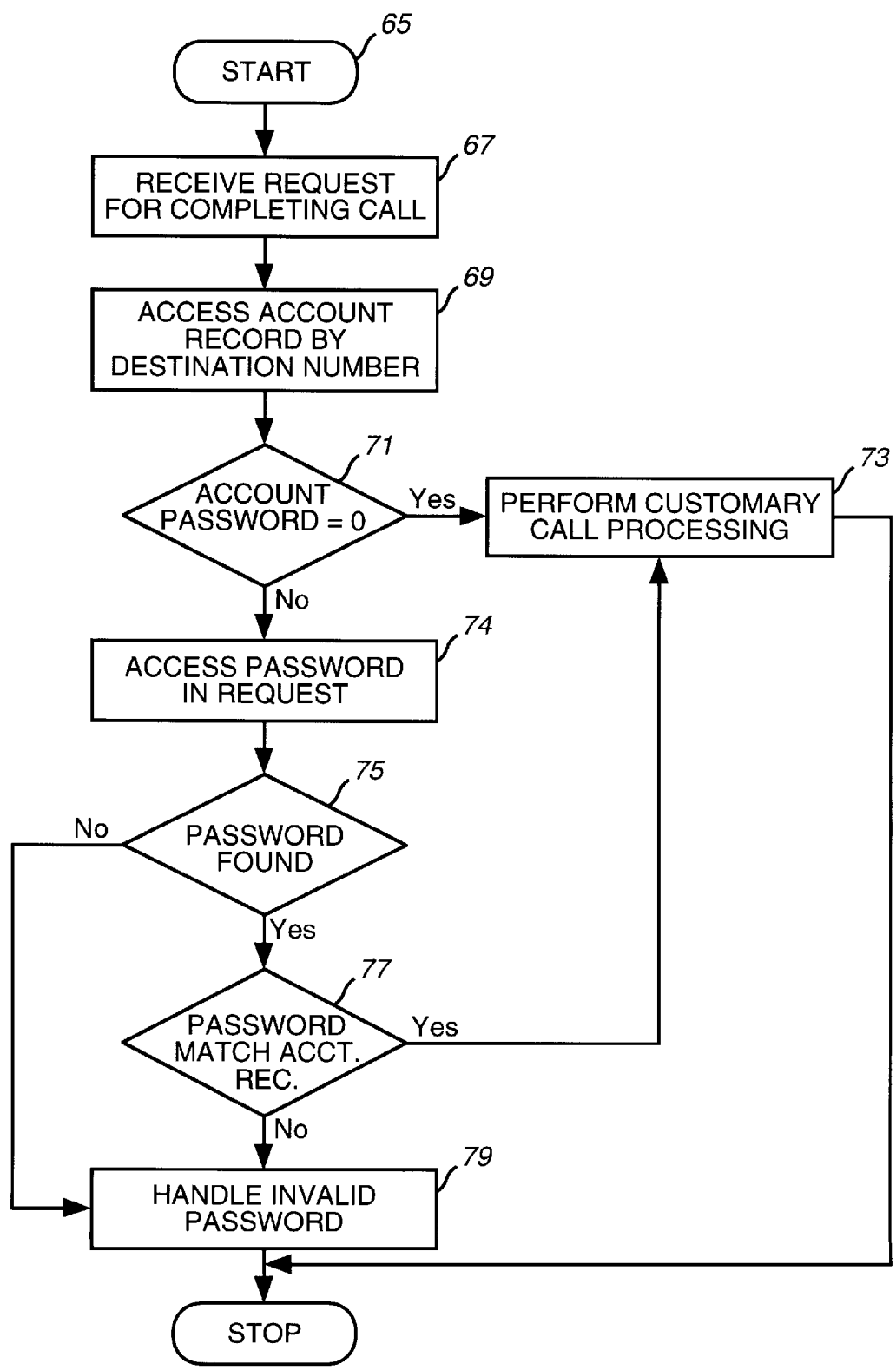
FIG. 4 is a high level flow chart of processing of calls at a terminating telephone switch according to the present invention.
Figure 5:
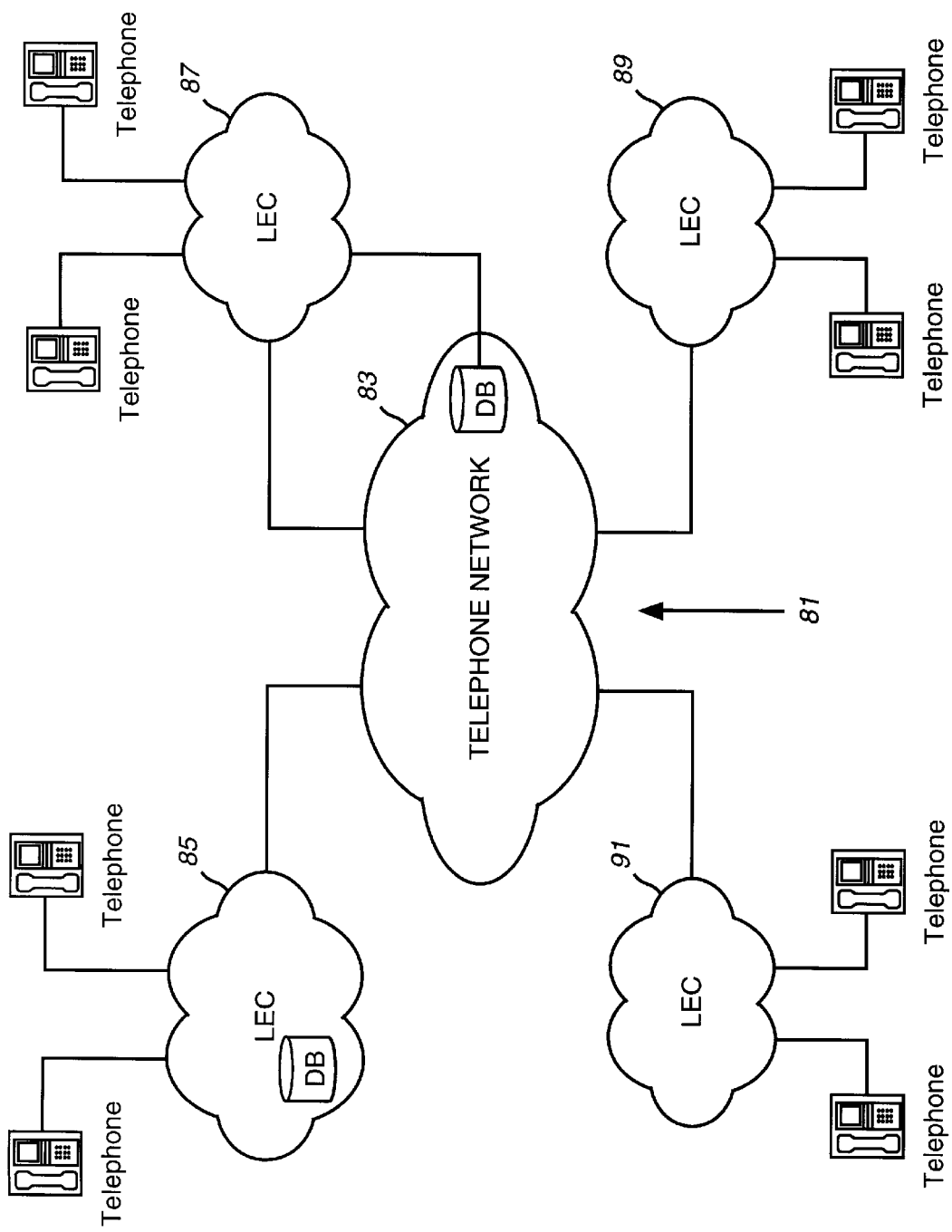
FIG. 5 is a block diagram illustrating the operation of the present invention in a telephone network.

Referring now to FIG. 4, processing at the terminating telephone switch starts at block 65. The system receives a request for completing a call at block 67 (according to block 63 of FIG. 3 processing) and accesses the user account record identified by the destination number at block 69. The system then tests at decision block 71 whether the password associated with the account record is set to universal access. If the owner of the destination number has designated universal access, then the system performs customary call processing at block 73. If universal access is not specified, then the system accesses the password that is included in the request for call completion at block 74. Then, the system tests at decision block 75 whether or not the request includes a password. If so, the system then tests at decision block 77 whether or not the password of the request matches the password of the account record. If so, the system performs customary call processing to complete the call at block 73.

If either the request does not include a password, at decision block 75, or the password included does not match the password of the account record, at decision block 77, the system handles the invalid password at block 79. The system preferably sends a status code to the originating telephone switch indicating that the call will not be completed because of a password failure. In any event, the terminating telephone switch will abort the call request and not complete a call to the destination number. Thus, in the event of a failed password, the telephone at the destination number will not ring.

Referring now to FIG. 4, a large telecommunications network is designated generally by the numeral 81. FIG. 4 is intended to illustrate co-existence and migration issues. Telecommunications system 81 includes a telephone network 83 that interconnects a plurality of local exchange carriers. The local exchange carriers include a LEC 85 and a LEC 87, each of which is password enabled according to the present invention. The local exchange carriers also include LEC 89 and LEC 91, neither of which is adapted to process calls according to the password processing of the present invention. As shown in FIG. 4, LEC 85 includes a local password database. LEC 87 accesses a database maintained in telephone network 83. Thus, the user account password database may be local, remote, private, or shared.

Since LEC 89 and LEC 91 are not enabled according to the process of the present invention, they work just like currently available systems. Thus, callers in LEC 91 can call numbers in LEC 91 or in LEC 89 in the same fashion as they do currently. However, since LEC 91 has no facility for processing trailing digits, a caller in LEC 91 can complete a call to a number in LEC 87 only if the password for the number in LEC 87 is set to universal access. In the preferred embodiment, universal access is the default, so that the account is set up and continues with universal access until the customer changes it.

Since LEC 85 and LEC 87 are enabled according to the present invention, calls from a caller in LEC 85 to numbers in LEC 85 or in LEC 87 are processed according to the present invention. For calls between complying local exchange carriers, as for example between LEC 85 and LEC 87, the password is carried along with the IAM for out-of-band signalling. For migration considerations, intermediate switches in telephone network 83 must pass on password data, otherwise the terminating LEC cannot support trailing digit passwords. Finally, if a caller in complying LEC 85 places a call to a number in non-complying LEC 89, non-complying LEC 89 ignores any password data and completes the call in the normal way. Intermediate switches in telephone network 83 may or may not be able to propagate password data. In any event, a caller in LEC 85 or LEC 87 can complete a call to numbers in LEC 89 or LEC 91, just as is done currently.

A fully complying network can be evolved to. Migration may include starting with local password enforcement, followed by participating LECs with intermediate switches that are enabled to pass along password data. Intermediate switches that are not enabled to pass along passwords can still be used for non-password calls even in a fully complying network.

From the foregoing, it may be seen that the present invention is well adapted to overcome the shortcomings of the prior art. The present invention provides ultimate privacy protection to those who wish to receive calls only from selected individuals. Additionally, by not completing password failed calls, the process of the present invention does not waste system resources by making and then terminating connections.

What is claimed is:

1. A method of completing a telephone call to a destination number, which comprises the steps of:
   receiving a request including dialed digits and a password for call completion to a destination number at a telephone network terminating switch;
   determining at said telephone network terminating switch whether the destination number has a password associated therewith; and,
   completing a call from said telephone network terminating switch to said destination number upon determining that said destination number has said password associated therewith and said password included with said call request matches the password associated with said destination number.

2. The method as claimed in claim 1, including the step of:
   completing said call from said telephone network terminating switch to said destination number when said destination number has no password associated therewith.

3. The method as claimed in claim 1, including the step of:
   completing said call from said telephone network terminating switch to said destination number when said destination number has a universal access password associated therewith.

4. The method as claimed in claim 1, including the step of:
   aborting the call request at said telephone network terminating switch whenever the password contained in said call request does not match the password associated with said destination number.

5. The method as claimed in claim 1, including the step of:
   aborting the call request at said telephone network terminating switch whenever said destination number has a password associated therewith and said call request contains no password.

6. A method of initiating a telephone call from an originating number to a destination number at a terminating switch, which comprises the steps of:
   receiving dialed digits from said originating number at a telephone network originating switch;
   comparing dialed digits received from said originating number to candidate dialing schemes at said telephone network originating switch;
   whenever a sequence of dialed digits received from said originating number satisfies a dialing scheme for a call to a destination number, receiving dialed password digits from said originating number at said telephone network originating switch;
   setting a destination number equal to the sequence of dialed digits received from said originating number that satisfies a dialing scheme for a call to a destination number;
   setting a password equal to the dialed password digits received from said originating number; and,
   forwarding a call request with the set destination number and the set password from said telephone network originating switch to said terminating switch for call processing.

7. The method as claimed in claim 6, wherein said step of receiving dialed password digits from said originating number includes the step of starting a password timer at said telephone network originating switch when said sequence of dialed digits received from said originating number satisfies a dialing scheme for a call to a destination number, and said step of setting a password equal to the dialed password digits received from said originating number includes the step of setting the password equal to the dialed password digits received from said originating number when said password timer times out.

8. The method as claimed in claim 6, wherein said step of setting a password equal to the dialed password digits received from said originating number includes the step of setting the password equal to the dialed password digits received from said originating number when the number of digits received equals a maximum password length.

9. A method of completing a telephone call to a destination number at a terminating switch from an originating number, which comprises the steps of:
   receiving dialed digits from said originating number at a telephone network originating switch;
   comparing dialed digits received from said originating number to candidate dialing schemes at said telephone network originating switch;
   whenever a sequence of dialed digits received from said originating number satisfies a dialing scheme for a call to a destination number at said terminating switch, receiving dialed password digits from said originating number at said telephone network originating switch;
   setting a destination number equal to the sequence of dialed digits received from said originating number that satisfies a dialing scheme for a call to a destination number;
   setting a password equal to the dialed password digits received from said originating number;
   forwarding a call request with the set destination number and the set password from said telephone network originating switch to said terminating switch for call processing;
   receiving the call request at said terminating switch;
   determining at said telephone network terminating switch whether the destination number has a password associated therewith;
   comparing at said telephone network terminating switch the set password with the password associated with the destination number; and,
   completing a call from said telephone network terminating switch to said destination number when the set password matches the password associated with said destination number.

10. The method as claimed in claim 9, including the step of:

completing said call from said telephone network terminating switch to said destination number when said destination number has no password associated therewith.

11. The method as claimed in claim 9, including the step of:

completing said call from said telephone network terminating switch to said destination number when said destination number has a universal access password associated therewith.

12. The method as claimed in claim 9, including the step of:

aborting the call request at said telephone network terminating switch whenever the set password contained in said call request does not match the password associated with said destination number.

13. The method as claimed in claim 9, including the step of:

aborting the call request at said telephone network terminating switch whenever said destination number has a password associated therewith and said call request contains no password.

14. The method as claimed in claim 9, wherein said originating number is in said terminating switch.

15. The method as claimed in claim 9, wherein said originating number is in an exchange other than said terminating switch.

16. A method of initiating a telephone call from an originating number to a destination number, which comprises the steps of:

receiving dialed digits from said originating number at a telephone network originating switch;

comparing dialed digits received from said originating number to candidate dialing schemes at said telephone network originating switch;

whenever a sequence of dialed digits received from said originating number satisfies a dialing scheme for a call to a destination number, starting a trailing digit timer at said telephone network originating switch;

receiving trailing digits from said origination number at said telephone network originating switch;

upon the first to occur of the timing out of said trailing digit timer or the receipt of a predetermined maximum number of trailing digits, setting a destination number equal to the sequence of dialed digits received from said originating number that satisfies a dialing scheme for a call to a destination number;

setting a password equal to the trailing digits received from said originating number; and, forming a call request with the set destination number and the set password.

17. A system in a local exchange carrier for completing a telephone call to a destination number, which comprises:

means for receiving a request including dialed digits and a password for call completion to a destination number at a terminating switch of said local exchange carrier;

means for determining whether the destination number has a password associated therewith; and, means for completing a call from said terminating switch of said local exchange carrier to said destination number upon determining that said destination number has said password associated therewith and said password included with said call request matches the password associated with said destination number.

18. A system in a local exchange carrier for initiating a telephone call from an originating number to a destination number at a terminating local exchange, which comprises:

means for receiving dialed digits from said originating number at an originating switch of said local exchange carrier;

means for comparing dialed digits received from said originating number to candidate dialing schemes;

means for receiving dialed password digits from said originating number whenever a sequence of dialed digits received from said originating number satisfies a dialing scheme for a call to a destination number;

means for setting a destination number equal to the sequence of dialed digits received from said originating number that satisfies a dialing scheme for a call to a destination number;

means for setting a password equal to the dialed password digits received from said originating number; and, means for forwarding a call request with the set destination number and the set password to said terminating local exchange for call processing.

19. A telephone system, which comprises:

an originating switch including:
means for receiving dialed digits from said originating number;
means for comparing dialed digits received from said originating number to candidate dialing schemes;
means for receiving dialed password digits from said originating number whenever a sequence of dialed digits received from said originating number satisfies a dialing scheme for a call to a destination number;
means for setting a destination number equal to the sequence of dialed digits received from said originating number that satisfies a dialing scheme for a call to a destination number;
means for setting a password equal to the dialed password digits received from said originating number; and,
means for forwarding a call request with the set destination number and the set password to said terminating local exchange for call processing; and, a terminating switch including:
means for receiving a request for call completion to a destination number;
means for determining whether the destination number has a password associated therewith;
means for determining whether the call request includes a password; and,
means for completing a call to said destination number when the password included with said call request matches the password associated with said destination number.

\* \* \* \* \*